July 21, 1959 E. P. HAWTHORNE 2,895,212
COMBUSTION TURBINES
Filed Feb. 24, 1953 2 Sheets-Sheet 2
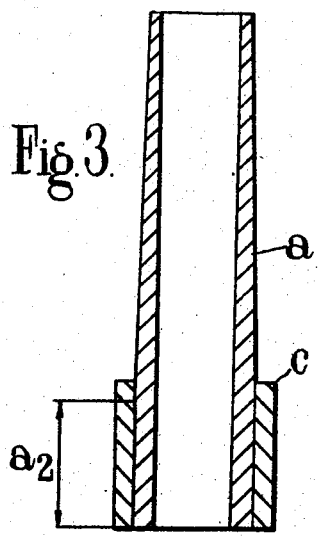
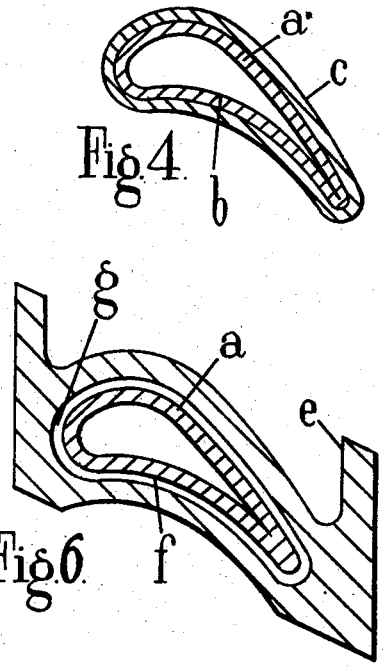
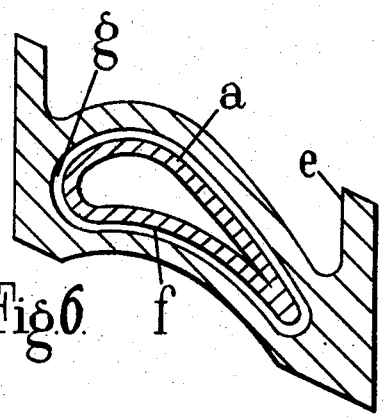
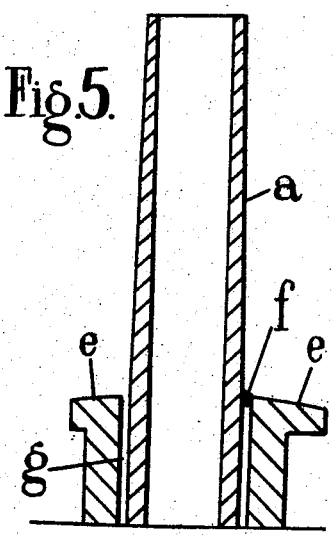
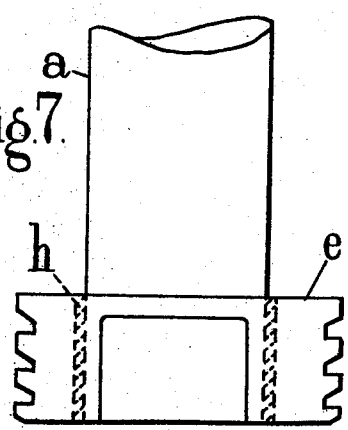
Edward Paterson Hawthorne

United States Patent Office 2,895,212
Patented July 21, 1959

2,895,212

COMBUSTION TURBINES

Edward Peterson Hawthorne, Newcastle-upon-Tyne, England, assignor to C. A. Parsons & Company Limited, Newcastle-upon-Tyne, England Application February 24, 1953, Serial No. 338,479

Claims priority, application Great Britain February 22, 1952

2 Claims. (Cl. 29—156.8)

This invention relates to combustion turbines of all types embracing those in which the working fluid may be obtained from a solid-liquid or gaseous source, for instance, coal, oil, or gas, and which may be produced either internally or externally. It is specially applicable to the method of manufacture of turbine blades according to British Patent No. 653,267, but it is not limited to that method.

Though it relates more particularly to the manufacture of hollow blades for combustion turbines, it may also be used for the manufacture of solid blades. It will be described herein, namely with reference to hollow blades.

Where combustion turbine blades are made from two parts consisting respectively of a skirt and a root, the latter having a hole extending into or through it, the hole being of the same shape throughout its length as the corresponding part of the root section of the blade skirt, the skirt being inserted into the root and the two joined together by any suitable bonding method, for example brazing, it is in practice not necessarily easy to effect this brazing expeditiously and uniformly with reference to a large number of such blades.

The object of the present invention is to provide a method for effecting this.

The invention consists in a method of manufacturing turbine blades for combustion turbines in accordance with any of the following numbered clauses, namely:

Clause 1.—The blade skirt and blade root are made in such a way that the parts being or to be joined have the same shape, that is to say the end of the blade skirt to be inserted into the blade root and the hole in the blade root are of the same shape, but of different size so that there is a deliberately made gap between the skirt and the root uniform in thickness, which gap is preserved until the two parts are united by brazing or soldering;

Clause 2.—A method in accordance with Clause 1, in which the gap is obtained by affixing around the root section of the blade a layer of known thickness;

Clause 3.—A method in accordance with Clause 2, in which the layer is of a ceramic material;

Clause 4.—A method according to Clause 2, in which the layer is produced by electro-deposition or any other suitable method of deposition of iron, nickel, or other metal;

Clause 5.—A method according to Clause 3, in which the ceramic is applied as by spraying or dipping;

Clause 6.—A method in accordance with Clause 3, in which the ceramic is applied by placing a strip of glass cloth of suitable thickness around the blade and impregnating it with a ceramic which is then allowed to dry;

Clause 7.—A method in accordance with any of Clauses 1 to 6, in which the gap is preserved by spot welding the base of the blade and the root;

Clause 8.—A method in accordance with any of Clauses 2 to 7, in which the layer between the root and the blade is removed after the blade and root have been assembled for brazing or soldering;

Clause 9.—A method of producing combustion turbine blades with a separate skirt and a cast root both brazed together, in which:

(1) The hollow blade skirt is produced from a tube of any suitable material, usually metal, which is machined to a required inner diameter, then pressed over a solid mandrel, and tapered over its length;

(2) A layer of any suitable material of predetermined thickness is fixed around the root part of the skirt;

(3) The root is cast around this layer and hence around the root portion of the skirt;

(4) Skirt and root portions are separated;

(5) The layer, producing the gap between skirt and root is removed;

(6) The skirt is located in the root and fixed by shimming or spot welding or any other suitable method;

(7) Skirt and root are finally joined together by brazing, the brazing material filling the gap provided between the two parts to be joined together.

The invention also consists in improved methods for producing combustion turbine blades substantially as herein described.

The invention also consists in combustion turbine blades affixed to blade roots by any of the new aforesaid methods.

Referring to the accompanying diagrammatic drawings:

Figure 3 is a longitudinal section of a hollow blade skirt surrounded in part by a sleeve or layer of predetermined thickness;

Figure 4 is a cross-section at right angles to Figure 3 showing a blade profile;

Figure 5 illustrates in longitudinal section the blade in a root with a gap between blade and root, the two being attached at one place;

Figure 6 is a cross-section at right angles to Figure 5;

Figure 7 represents a completed blade and root.

Figure 1:
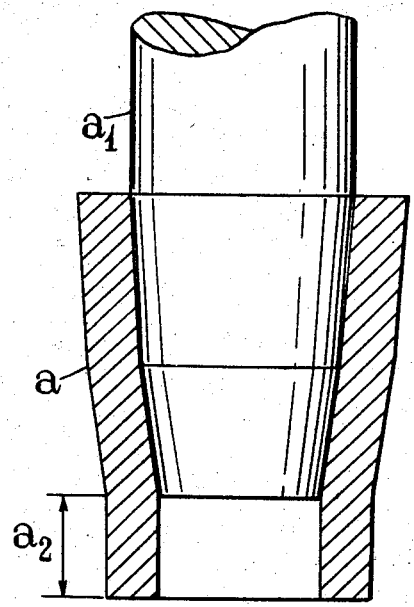
Figure 1 shows a mandrel over which the tube is pressed to obtain a taper substantially over its length.
Figure 2:
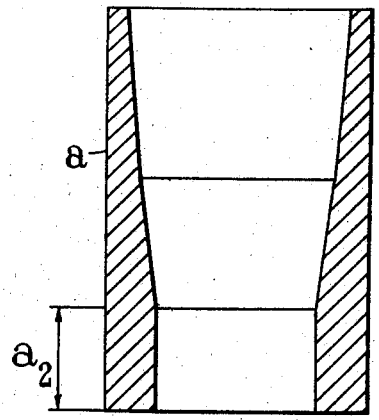
Figure 2 illustrates the tapered tube with a constant wall thickness at one end.

In carrying the invention into effect in the best method known to me in its application to a hollow blade and illustrated in the accompanying diagrammatic drawings, a tube $a$ of any suitable material usually metal, is machined to a required inside diameter and is then pressed over a solid mandrel having one or more tapers over its length. The mandrel is given the reference letter $a_1$, the tube $a$ is pressed over this mandrel to obtain a taper substantially over its entire length. The portion of the blade which is to be inserted in the root, namely that indicated by $a_2$ is not pressed on to the mandrel and therefore maintains its uniform thickness. The tube is then machined or ground externally to the required diameter so that the outside wall of the tube is parallel to the axis of the mandrel as shown in Figure 2. While it is not imperative for the tube to have a tapering wall thickness it is desirable in most cases from a stress point of view. The tube is removed from the mandrel and is pressed or formed to a required profile shape as shown at $b$ in Figures 4. It is shown surrounded by a layer of predetermined thickness marked with the reference letter $c$ and referred to again below.

Although most of the blade skirt length may or may not have a tapered wall thickness according to the stress conditions under which the blade will be operating, it is preferable that the portion of the blade skirt around which the blade root is to be formed is kept of constant wall thickness and with its outside wall parallel to the axis of the blade skirt. It is not detrimental, however, to this invention for the wall thickness to be tapered or to be formed with a wedge-shaped section on the outside wall.

The root portion may be formed separately by either machining or broaching or casting and either as a complete piece with a hole through it into which the blade skirt may be fitted or as separate parts fitting individually around the blade skirt, but the preferable method for this invention is to cast the root direct around the blade skirt. This eliminates many extra operations and particularly removes the necessity for achieving a high accuracy on the root portion in order that the root and blade skirt should fit together properly. Once the root is formed the final turbine blade is produced by joining the root to the blade skirt by brazing or soldering.

The method of casting-on and joining the root to the blade skirt is important. For brazing alloys having satisfactory strength properties at high temperatures, it is important that there must be a sufficient gap between the root and the blade skirt as will ensure the brazing alloy flowing into and all around the joint. Further the gap between the root and the blade should not be so large as to allow of there being so much brazing alloy, which in itself is of relatively low strength, that the joint is too weak. The gap therefore must be controlled in amount. It is not necessary that this gap is nowhere exceeded beyond the aforesaid amount, and the extent to which it may be exceeded is dictated by the extent to which the strength of the joint may be reduced with safety under the operating conditions. Ordinarily the maximum gap width is five thousandths of an inch (.005) and the minimum width half a thousandth of an inch (0.0005). These limits vary with the brazing material used which must be capable of withstanding high temperatures.

In order that the correct gap may be obtained I prefer to affix around the root section a layer $c$ of known thickness referred to above. This layer $c$ may be produced by electro-deposition or any other known method of deposition of iron, nickel or any other metal or preferably a ceramic. The ceramic may be put upon the blade skirt either by spraying or dipping, but the most successful method is to place a strip of glass cloth of the known thickness around the blade and impregnate it with a ceramic which is then allowed to dry. By this means a refractory coating of a known thickness is obtained on the blade skirt and is sufficiently robust to withstand the pouring of a hot root metal around it. The coated blade skirt is fitted into a mould in the usual manner and the root metal cast around it. When the root metal is solidified the blade skirt is removed from the root, either by removing the metal plating with acid or by forcing the skirt out of the root if a ceramic coating has been used. It is desirable that the ceramic be sufficiently friable as to allow the skirt to be removed without excessive loading.

After cleaning, and with reference more particularly to Figures 5 and 6, the blade skirt $a$ is located in the root $e$ again in any suitable manner, as for instance, by shimming and spot welding $f$, so that there is a clear air space $g$ between the blade skirt $a$ and the root $e$. Referring now to Figure 7 the blade skirt is then brazed to the root, by brazing alloy $h$ filling the air space $g$.

I claim:
1. In the manufacture of turbine blades for combustion turbines of the type comprising a hollow blade skirt of aerofoil cross section and a root part attached to the said skirt for the purpose of fixing same to the turbine rotor, the method of forming and attaching the root part, which comprises affixing to the lower end of the blade skirt a removable layer of uniform thickness, the said removable layer having a thickness in a range from substantially .0005 to .005 inch, casting the blade root around the said removable layer, separating the blade from the root, removing the said layer from the blade skirt, then bringing the skirt and root together, with the skirt located within the root in the same position as during casting, and then brazing or soldering the two parts together, whereby a uniform thickness of brazing material between skirt and root is ensured.

2. In the manufacture of turbine blades for combustion turbines of the type comprising a hollow blade skirt of aerofoil cross section and a root part attached to the said skirt for the purpose of fixing same to the turbine rotor, the method of forming and attaching the root part, which comprises affixing to the lower end of the blade skirt a removable layer of uniform thickness, and of the order of magnitude of five thousandths of an inch to half a thousandth of an inch by placing a strip of glass cloth around the blade and impregnating it with a ceramic which is then allowed to dry, casting the blade root around the said removable layer, separating the blade from the root, removing the said layer from the blade skirt, then bringing the skirt and root together, with the skirt located within the root in the same position as during casting, and then brazing or soldering the two parts together, whereby a uniform thickness of brazing material between skirt and root is ensured.

References Cited in the file of this patent

UNITED STATES PATENTS

| | | |
|---|---|---|
| 1,005,736 | Wilkinson | Oct. 10, 1911 |
| 1,530,249 | Eveleth | Mar. 17, 1925 |
| 1,869,478 | Heath | Aug. 2, 1932 |
| 1,947,347 | Lorenzen | Feb. 13, 1934 |
| 2,143,462 | Allard | Jan. 10, 1939 |
| 2,287,848 | Wessel | June 30, 1942 |
| 2,510,735 | Bodger | June 6, 1950 |
| 2,526,194 | Brauchler | Oct. 17, 1950 |

FOREIGN PATENTS

| | | |
|---|---|---|
| 238,186 | Switzerland | Nov. 1, 1945 |
| 574,440 | Great Britain | Jan. 4, 1946 |
| 625,693 | Great Britain | July 1, 1949 |